J. CARNEY.
ATTACHMENT FOR CORN PLANTERS.
APPLICATION FILED DEC. 23, 1912.
1,116,381.
Patented Nov. 10, 1914.
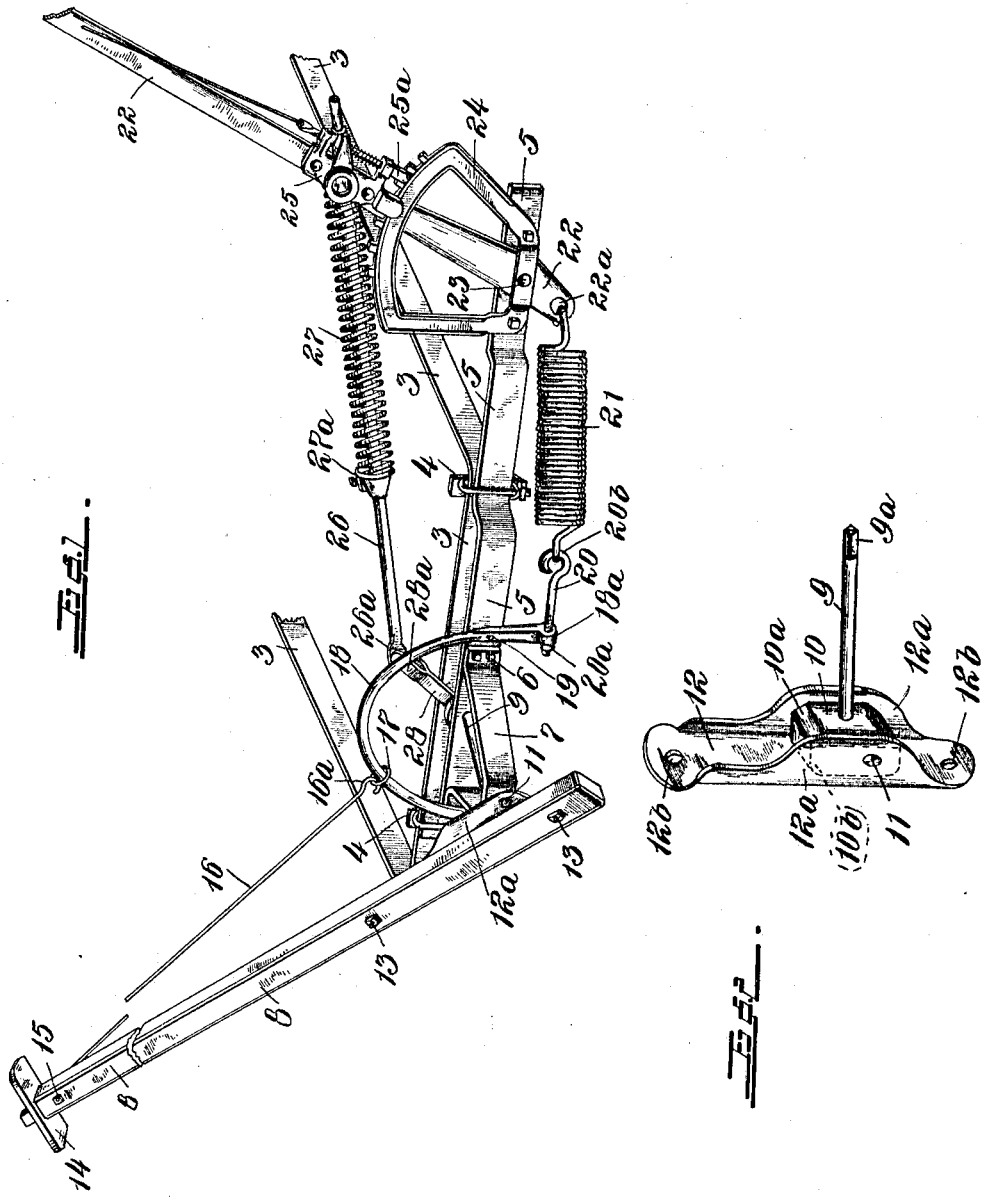

UNITED STATES PATENT OFFICE.

JOHN CARNEY, OF CHATSWORTH, ILLINOIS.

ATTACHMENT FOR CORN-PLANTERS.

1,116,381.  Specification of Letters Patent.  Patented Nov. 10, 1914.

Application filed December 23, 1912. Serial No. 738,124.

*To all whom it may concern:*

Be it known that I, JOHN CARNEY, citizen of the United States, residing at Chatsworth, in the county of Livingston and State of Illinois, have invented certain new and useful Improvements in Attachments for Corn-Planters, of which the following is a specification.

This invention relates to improvements in markers for corn planters and particularly to the marker shown in United States Patent No. 992,401, issued May 16, 1911.

The particular object of the improvements set forth in this application for patent is to provide means for supporting the marker bar more effectively than those shown in said patent, and also to avoid the necessity of having a rope extending from the outer end of the marker bar to the front end of the corn planter frame which is the common expedient in corn planters in general use.

In the accompanying drawing which forms a part of this application I have illustrated a preferred embodiment of my improvement, in which:—

Figure 1 is a perspective view showing my improved attachment combined with the rear portion of a corn planter frame, and Fig. 2 is a detached detail of the immediate connections between the marker bar and the shaft which operates it.

Referring to the details of the drawing, 3 represents a portion of the side members, and the rear member of a corn planter frame, and 4 represents clips by which a supplemental frame consisting of a flat bar set vertically and having suitable bends therein, is connected with the planter frame 3. Under certain conditions, and especially where the planter frame will admit of the direct attachment of the operative parts of my device, the supplemental frame 5 may be dispensed with.

Secured rigidly to the rear side of the frame 5 and projecting at right angles therefrom, is a U-shaped yoke 7, the ends of which are flanged outwardly and secured by bolts 6 to the frame 5, the position of said yoke being such that its center is in line with the longitudinal center of the planter frame 3.

8 represents the marker bar which is of the usual form and proportions and is supported from the yoke 7 by a shaft 9 which is journaled in said yoke and in the frame 5 and has one end squared as at $9^a$. On the outer end of said shaft 9 is a block 10 which has its corners rounded as at $10^a$ and $10^b$. Said block fits between the side flanges $12^a$ of the bracket 12 and is pivotally secured therein by a bolt 11. The bracket 12 is provided with bolt holes $12^b$ in its respective ends which are adapted to receive bolts 13 which pass through suitable holes provided therefor in the marker bar thus affording a long bearing on said bar. At the outer end of the marker bar is the marker board or finger 14. Near the marker board 14 is secured by a nut 15 the outer end of a brace rod 16 the opposite end of which is bent into hook form as at $16^a$ and engages loosely a rim 17 which loosely encircles the arch bracket 18 which is rigidly bolted near its respective ends by bolts 19 to the rear side of the supplemental frame 5, so that said arch straddles the yoke 7. One end of the arch 18 is extended downwardly from the frame 5 and is enlarged at $18^a$ and this enlarged portion is internally threaded to receive the threaded end of a hook bolt 20 which carries a nut $20^a$ at its threaded end and has its hooked end $20^b$ engaged by one end of an expansible coiled spring 21, 21, the other end of which spring engages a hole $22^a$ in the lower end of a lever 22 which is fulcrumed on a bolt 23 secured in the lower portion of the segment 24, and extends from the frame 5. The toothed segment 24 coöperates with a casting 25 which carries the usual yielding pawl $25^a$ and also has provided therein a bearing for a rod 26. On this rod is fixed a collar $27^a$ which serves as a bearing for a compression spring 27 surrounding said bar between said collar and the casting 25. The inner end of the rod 26 is flattened at $26^a$ and is pivotally connected with the fork $28^a$ of a lever 28 the opposite end of which is fitted to the squared end $9^a$ of the shaft 9.

The operations and functions of the hook bolt 20, spring 21, lever 22, segmental yoke 24, casting 25, rod 26, and spring 27, are identical with the corresponding parts shown in the aforesaid patent. The supplemental frame 5 is substantially the same as the supplemental frame 4 of said patent, though it is made in one piece instead of two. By offsetting a portion of the frame 5 from the frame 3 and attaching the bracket 7, I am enabled to obtain a long bearing for the shaft 9 which is desirable inasmuch as a considerable portion of the weight of the marker bar falls upon the outer end of said shaft. I am also enabled to apply the lever 28 to the inner end of the shaft 9, thereby bringing said lever into direct alinement with the rod 26, the advantages of which are manifest. The chief advantage, however, of my improvements lies in the combination of the arch 18 and the brace rod or wire 16.

It will be understood, of course, that the marker bar is of considerable length and weight and therefore exerts great stress as ordinarily arranged upon the connection between it and the means for racking or adjusting said bar. In my improvement this strength is borne in part by the arch and rod referred to, thus relieving the bracket 12 and shaft 9 from the excessive strains referred to. As the marker bar is thrown from one side of the machine to the other in its ordinary use the ring will slide readily along the arch 18 it being understood that the arch is concentric with the shaft 9 which represents the pivotal axis of the bar 8. If the rod 16 should break the bar 8 would swing outwardly on the pivot represented by the bolt 11 the rounded lower corners of the block 10 permitting such movement and thus relieving the other parts of the attachment from danger of breakage.

Having thus described my invention, what I claim as new, is:—

In a marker attachment for corn planters, the combination of a supplemental frame consisting of a single flat bar bent to form an offsetting portion, clips for attaching said bar to the frame of the corn planter, a yoke rigidly secured to the offset portion of said bar, a rock shaft having bearings in said bar and yoke, a bracket, means connecting said bracket and said shaft whereby the bracket may swing outwardly from said shaft, an arch rigidly secured to the offset portion of said frame, a marker bar rigidly secured to said bracket, a brace rod connected at one end with said marker bar and having a sliding connection on said arch, and means for operating said rock shaft, said means supported by said first named frame.

In testimony whereof I affix my signature in the presence of two witnesses.

JOHN CARNEY.

Witnesses:
CHAS. F. SHAFER,
J. C. CORBETT.